H. WEBSTER AND W. B. KINCAID.
CONTINUOUS BRICK KILN AND DRIER.
APPLICATION FILED NOV. 26, 1917.

1,304,831.

Patented May 27, 1919.
4 SHEETS—SHEET 1.

Inventors
Henry Webster and
William B. Kincaid
By
Attorney

H. WEBSTER AND W. B. KINCAID.
CONTINUOUS BRICK KILN AND DRIER.
APPLICATION FILED NOV. 26, 1917.

1,304,831.

Patented May 27, 1919.
4 SHEETS—SHEET 2.

Inventors
Henry Webster and
William B. Kincaid,
By
Attorney

H. WEBSTER AND W. B. KINCAID.
CONTINUOUS BRICK KILN AND DRIER.
APPLICATION FILED NOV. 26, 1917.
1,304,831.
Patented May 27, 1919.
4 SHEETS—SHEET 3.
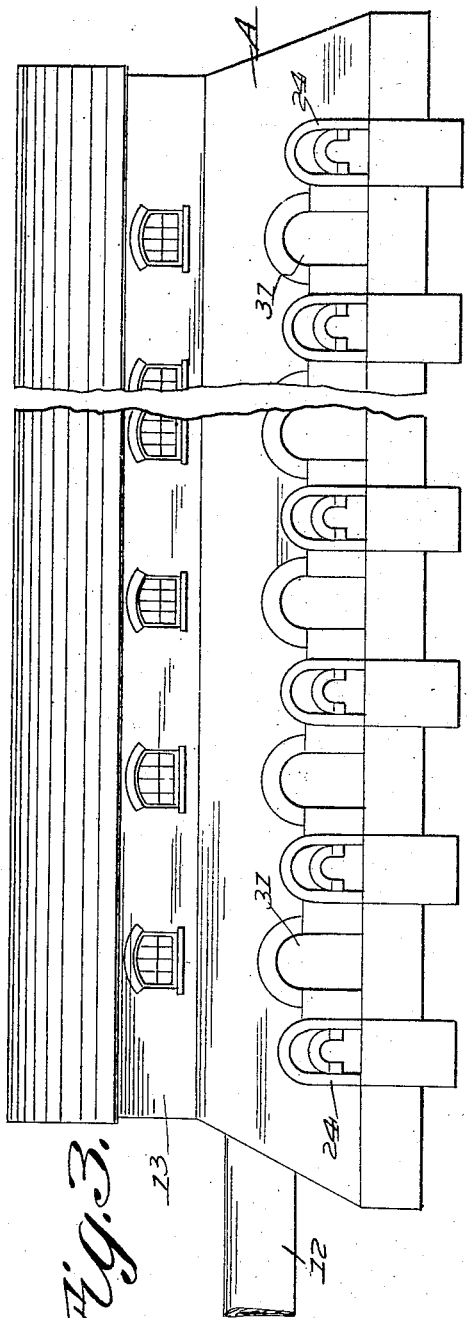
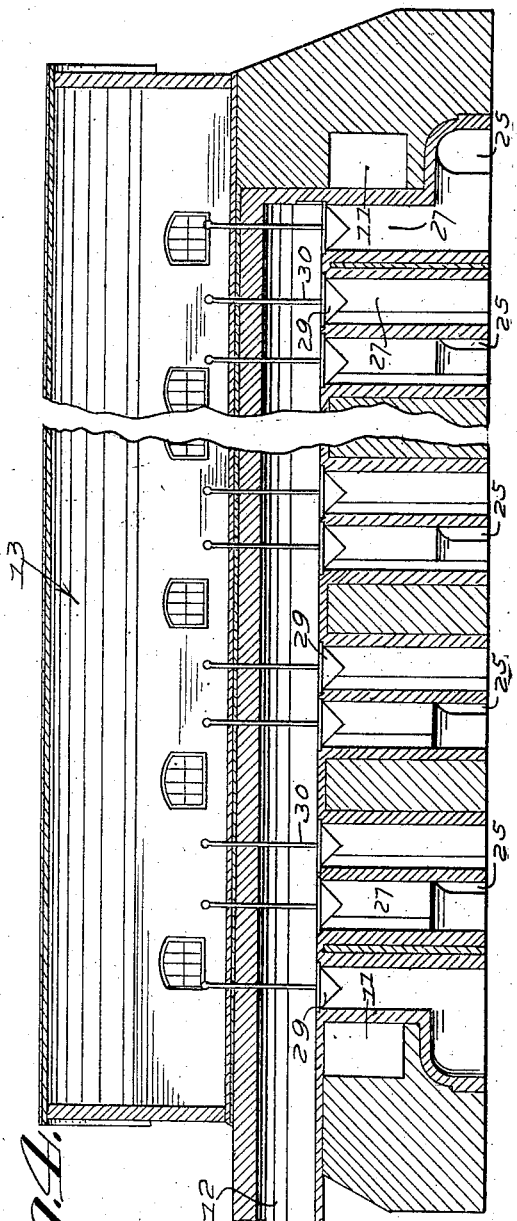

H. WEBSTER AND W. B. KINCAID.
CONTINUOUS BRICK KILN AND DRIER.
APPLICATION FILED NOV. 26, 1917.
1,304,831.
Patented May 27, 1919.
4 SHEETS—SHEET 4.
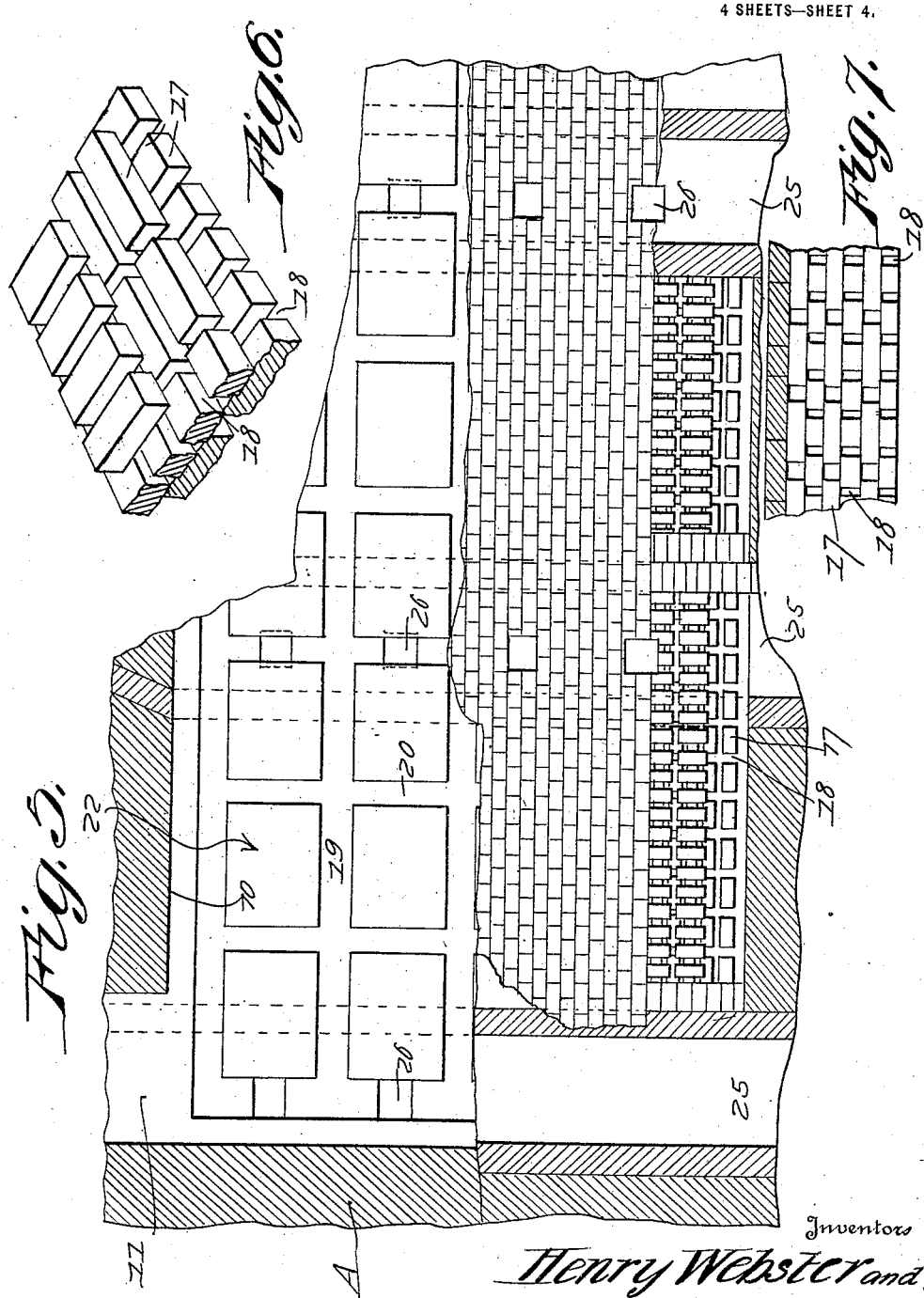
Inventors
Henry Webster and
William B. Kincaid,
By
Attorney

UNITED STATES PATENT OFFICE.

HENRY WEBSTER, OF NEWPORT, KENTUCKY, AND WILLIAM B. KINCAID, OF CINCINNATI, OHIO.

CONTINUOUS BRICK KILN AND DRIER.

1,304,831.  Specification of Letters Patent.  Patented May 27, 1919.

Application filed November 26, 1917. Serial No. 204,033.

*To all whom it may concern:*

Be it known that we, HENRY WEBSTER, a subject of the King of Great Britain, residing at Newport, county of Campbell, State of Kentucky, and WILLIAM B. KINCAID, a citizen of the United States, residing at Cincinnati, in the county of Hamilton and State of Ohio, have invented new and useful Improvements in Continuous Brick Kilns and Driers, of which the following is a specification.

This invention comprehends generally improvements in kilns and more particularly has reference to a continuous brick kiln and drier.

The primary object of the invention is the provision of a kiln of this character wherein a continuous up-down and horizontal draft is attained for the horizontal combustion which travels in a circuitous course through a continuous chamber in which are stacked green bricks, for the burning of the same, the vapor being prevented from condensation and is utilized for the burning of the bricks which latter, in the burning process, emit gas, adding to the products of combustion for the perfect working of the kiln with minimum consumption of fuel.

Another object of the invention is the provision of a kiln of this character wherein the heat arising from the green bricks will co-act with the products of combustion for the burning and drying of the bricks, and such products of combustion will have a combined up-down and horizontal draft, so that perpetual and uniform circulation thereof will exist for the drying and burning of the bricks throughout the area of the bricks within the kiln with uniformity.

A further object of the invention is the provision of a kiln of this character wherein the fuel utilized for the firing of the kiln is admitted through the roof of the combustion chamber, which is continuous, and delivered into the troughs in the bottom of the chamber, also through the furnace to the side of the kiln and distributed in the bottom of the combustion chamber which is continuous and delivered in the bottom of the combustion chamber, whence the firing of the fuel will be more perfectly effected so that the burning of the fuel will take place more uniformly and continuously at the bed or base of the combustion chamber, and also at the roof of the combustion chamber, giving the effect of both up and down draft. The products of the furnace or hot air chamber at the side will be retarded by partitions or baffles formed by the green bricks closely stacked at intervals in front of the openings causing the heat or gas therefrom to travel to the roof of the combustion chamber, thence down through the bricks to assure of the perfect burning of the bricks thereof and also permitting the stacking of green bricks within the chamber preceding the firing therein during the operation of the kiln.

A still further object of the invention is the provision of a furnace wherein the gases therefrom will travel in the fuel and through the bottom of the combustion chamber and each chamber thereof of the said kiln, assuring an even heat at all parts of the kiln and for the purpose of getting the top as well as the bottom of the combustion chamber at an equal heat.

The invention accordingly consists in the features of construction, combination of elements and arrangement of parts which will be exemplified in the construction hereinafter described and the scope of the application of which is indicated in the appended claims.

The invention is clearly illustrated in the accompanying drawings, wherein:

Fig. 3 is a side elevation.

Fig. 4 is a central longitudinal section.

Fig. 5 is a detail of the drying floor.

Fig. 6 is a perspective detail of the supporting bricks.

Fig. 7 is an elevational detail of the same.

Similar characters of reference are employed in all of the above described views to indicate corresponding parts.

Figure 1:
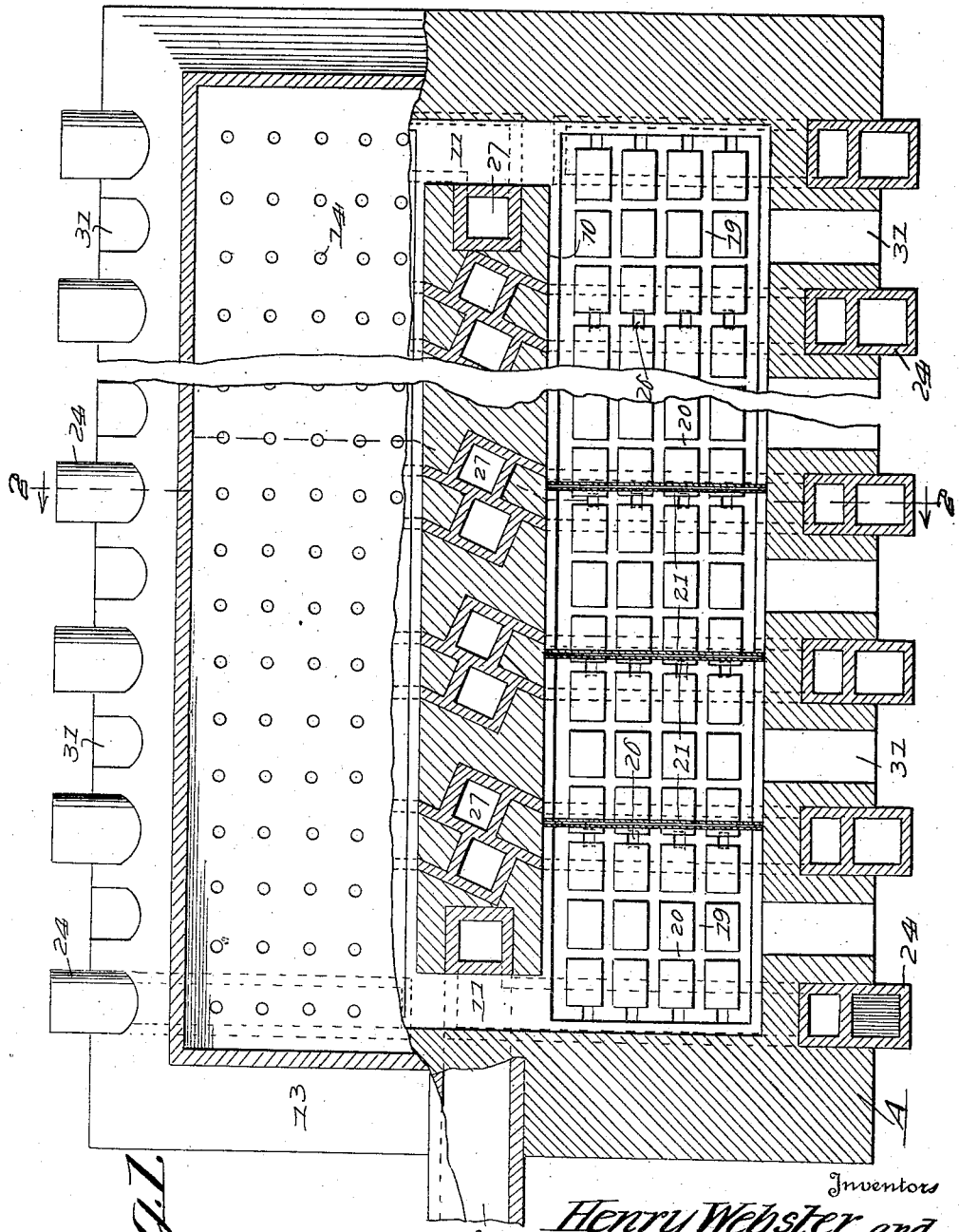
Figure 1 is a horizontal section showing both the fuel feeding floor and the brick burning floor.
Figure 2:
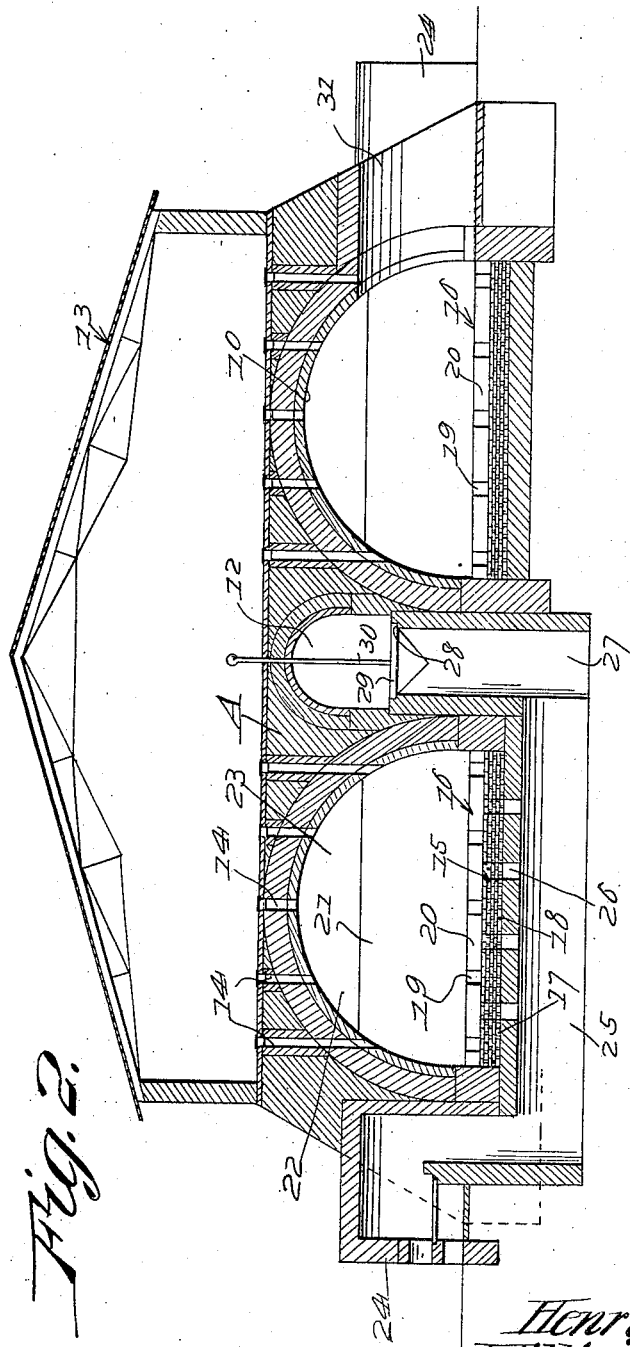
Fig. 2 is a transverse section on line 2—2 of Fig. 1.

Referring now, more particularly to the accompanying drawings, A designates generally, the body of the kiln which is desirably of a rectangular configuration and is formed interiorly thereof with a continuous chamber embodying spaced parallel side runs 10, the respective ends of which are arranged in communication with each other through the instrumentality of passage ways 11. Also formed within the body longitudinally thereof and between the side runs is a main flue 12, for a purpose that will appear.

Above the body of the kiln is a super-structure 13, which constitutes the fuel shed, and this shed is accessible to permit of delivery of fuel therein while the bottom of the shed is formed with a series of suitably spaced passages 14 which communicate with the side runs 10 to permit of the delivery of powdered fuel to the chambers in a manner and for a purpose which will hereinafter become apparent.

The bottom of each side run is formed in sections 15 and 16 arranged in superposed relation with each other, while the lower section is supported in spaced relation to the ground through the medium of a plurality of bricks 17 which are arranged or stacked in a honey-comb formation to provide air passages 18. The lower section of the bottom is composed of a layer of brick, while the upper section is formed in its upper surface with spaced longitudinal and transverse grooves or troughs 19 and 20. These grooves intersect each other and provide fuel receivers, the points of intersection of the grooves being desirably positioned beneath the passages 14 so that the fuel from the super-structure or shed may be readily deposited in the grooves when desired.

Adapted to be arranged at predetermined intervals in the chambers 10 are a plurality of temporary partitions 21 formed of green bricks. These partitions form a series of compartments 22, in each of the side run of the chamber, and in addition terminate short of the tops of the side runs, leaving spaces 23 which establish communication between adjacent compartments.

Located at the sides of each of the compartments 22 are furnaces of the Dutch oven type indicated generally by the numeral 24, while extending from these ovens transversely beneath the bottoms of the compartments of the chamber are flues 25 which communicate with the main flue 12 and in effect act as branches thereof. The flues 25 are arranged in communication with each of the compartments 32 by means of passages 26 formed through the honey-combed bricks 16 and terminating at the bottom of certain of the transverse grooves 20 and by reason of the spaces 23 above the partitions 21 the product of the ovens will be ultimately distributed equally to all parts of the kiln. The products of the ovens will also pass through the honey-combed structure beneath the bottoms of the compartments so as to heat the latter for drying purposes. The upper edges of the upright portions 27 of the flues 25 are designed to form valve seats 28. Valve heads 29 are normally positioned on the seats for preventing the passage of smoke, etc., into the main flue 12, while the valve rods 30 are connected to the valve heads 29 and slidably arranged through the body and positioned within the fuel shed from which point they are operable, by an attendant, when it is desired to arrange the flues 25 in communication with the main flue 12.

Formed in the side walls of the body at spaced intervals are door ways 31 which establish access to the several compartments 22 of the chamber 10 to permit of the charging thereof with green bricks and also the removal of the burned bricks therefrom, the door ways 31 being normally closed in any suitable manner so as to exclude outside air from the kiln.

The mode of operation of the invention may be reviewed as follows:

The fire is started in one of the ovens 24 positioned at the lower right hand of Fig. 1 and continues until the bricks in the adjacent compartment 22 get sufficiently hot to produce gas from the powdered fuel delivered from the top. The heated gas from the first compartment now passes horizontally into the second or adjacent compartment and also into the third compartment by reason of the spaces 23 above the partitions and serves to partly dry the bricks, and the heated gas also passes downwardly through the passages 26 in the bottom of the third compartment into the adjacent flue 25 beneath said passages; through said flue 25 and thence through the main flue 12 to a point remote from the kiln, a partition of paper or other suitable material is positioned to the left of the passages 26 in the third compartment and prevents the heated gases from passing into the fourth compartment. The furnaces or ovens leading to the second and third compartments are of course closed during the firing of the first compartment and are opened at the desired time while the cold air is at first gradually admitted to the furnace which communicates with the first compartment when it is being fired. Just before the bricks in the first compartment are fully burned, the oven which communicates with the second compartment is started to bring the heat in the latter to a sufficiently high temperature to properly burn the bricks therein. The paper partition to the left of the passages 26 of the third compartment is removed and a similar partition is provided to the left of passages 26 in the fourth compartment. This operation is continued until the end of the wall is reached, at which time the gases are conducted through the adjacent passageway 11 to the other side run 10 of the chamber on the opposite side of the kiln. In this connection it is to be understood that the vertical transverse partitions 21 prevent hot gases, etc., from passing horizontally through the lower portions of the compartments and at the same time direct the said hot gases upwardly between the tops of the compartments so that they will pass horizontally through the space 23 above the partitions. On the other hand, the temporary paper partitions above the partitions 21 serve to prevent the hot gases from passing horizontally from one compartment to another beyond that series of compartments which is being fired. The operation of the burning of the bricks in the series of compartments in the other side run of the chamber is in the reverse order to that in the first side run. Normally the openings 14 are closed. As fast as the compartments forward of the compartments provided with side fires are of high enough temperature to convert the powdered fuel into a gas, such fuel is fed in from the top to such chambers. The valves 30 controlling the flues are, as intimated operated from above. All of said valves are kept closed except the one connecting the flue adjacent to the partition mentioned.

It is believed in view of the foregoing description that a further detail description of the operation of the invention is entirely unnecessary likewise it is believed that the advantages of the invention will be readily apparent.

As many changes could be made in the above construction and many apparently widely different embodiments of this invention could be made without departing from the scope thereof and it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which as a matter of language might be said to fall therebetween.

The invention having been described what is claimed is:

1. A kiln of the character described including a body having a series of communicating compartments therein the tops of which are provided with fuel passages, a main flue provided in the body and a furnace communicating with the bottom of each compartment and with the main flue.

2. A kiln of the character described including a body having a series of communicating compartments therein the tops of which are provided with fuel passages, a main flue in the body, a plurality of furnaces, a draft flue leading from each furnace and arranged in communication with the adjacent compartment and with the main flue, and valve means for controlling the passage of the products of each furnace to the main flue.

3. A kiln of the character described including a body having a continuous chamber formed therein, a series of partitions mounted at spaced intervals in the chamber and forming a plurality of communicating compartments, the top of the chamber having passages therein through which fuel is fed to the compartments, a furnace arranged in communication with the bottom of each compartment, and a main flue for carrying off the products of the furnaces.

4. A kiln of the character described including a body formed with a continuous chamber embodying spaced side runs and passages establishing communication between the ends of the passages, a series of partitions in each of the side runs forming a plurality of compartments, the partitions terminating short of the top of the side runs to establish communication to the adjacent compartments, the body of the chamber having passages formed therein through which the fuel is led to the compartments, a honey-combed structure for supporting the bottom of the side runs, a plurality of furnaces, a draft flue extending from each furnace and arranged in communication with the honey-combed structure and with the bottom of each compartment, a main draft flue arranged in communication with each of these draft flues, and valve means for controlling the passage of the products of the furnace to the main flue.

5. A kiln of the character described including a body having a continuous chamber formed therein, a series of partitions in the chamber forming a plurality of compartments, the partitions terminating short of the top of the chamber leaving space for establishing communication between the compartments, the body of the chamber having passages therein through which fuel is fed to the compartments, the bottom of the chamber being formed in sections, a plurality of bricks arranged in a honey-combed structure formed for supporting the lower section of the bottom of the chamber, the upper section of the bottom of the chamber having a series of transversely and longitudinally intersecting fuel receiving grooves therein, a plurality of furnaces, a flue leading from each furnace and extending transversely beneath the bottom of each compartment and arranged in communication with the adjacent compartment and the honey-combed structure of bricks, a main flue communicating with each of these flues and manually operable valve means for controlling the passage of the products of the furnace to the main flue.

In testimony whereof we affix our signatures.

HENRY WEBSTER.
WM. B. KINCAID.